United States Patent
Lappalainen et al.

(10) Patent No.: US 9,627,981 B2
(45) Date of Patent: Apr. 18, 2017

(54) BIDIRECTIONAL SWITCHED MODE POWER SUPPLY

(71) Applicant: KONE Corporation, Helsinki (FI)

(72) Inventors: Seppo Lappalainen, Helsinki (FI); Tuomas Asikainen, Tuusula (FI); Pasi Raassina, Numminen (FI)

(73) Assignee: Kone Corporation, Helsinki, FL (US)

(*) Notice: Subject to any disclaimer, the term of this patent is extended or adjusted under 35 U.S.C. 154(b) by 98 days.

(21) Appl. No.: 14/670,109

(22) Filed: Mar. 26, 2015

(65) Prior Publication Data

US 2015/0280583 A1    Oct. 1, 2015

(30) Foreign Application Priority Data

Mar. 27, 2014 (EP) .................................... 14162014

(51) Int. Cl.
*H02M 3/335* (2006.01)
*H02M 3/337* (2006.01)

(52) U.S. Cl.
CPC ....... *H02M 3/33507* (2013.01); *H02M 3/337* (2013.01)

(58) Field of Classification Search
CPC ........ H02M 3/22; H02M 3/325; H02M 3/335; H02M 3/33569; H02M 3/3155; H02M 1/12; H02M 7/5387
USPC .......................... 363/15–17, 39, 40, 131, 132
See application file for complete search history.

(56) References Cited

U.S. PATENT DOCUMENTS

| | | | |
|---|---|---|---|
| 8,230,978 B2* | 7/2012 | Agirman | B66B 5/027 187/290 |
| 2006/0139823 A1* | 6/2006 | Shoji | H02M 1/34 361/56 |
| 2010/0244775 A1* | 9/2010 | Smith | H02M 3/33584 320/140 |
| 2013/0003423 A1* | 1/2013 | Song | H02M 3/33584 363/21.02 |
| 2013/0003424 A1* | 1/2013 | Song | H02M 3/33584 363/21.04 |
| 2013/0343093 A1* | 12/2013 | Ando | H02M 3/33584 363/17 |
| 2014/0009972 A1* | 1/2014 | Chiang | H02M 3/337 363/21.04 |
| 2015/0180350 A1* | 6/2015 | Huang | H02J 7/0068 307/66 |
| 2016/0149502 A1* | 5/2016 | Kidera | H02M 3/33584 363/21.06 |

* cited by examiner

*Primary Examiner* — Adolf Berhane
(74) *Attorney, Agent, or Firm* — Birch, Stewart, Kolasch & Birch, LLP

(57) ABSTRACT

Invention is related to a bidirectional switched mode power supply for elevator power systems. The bidirectional switched mode power supply comprises an input for selecting power supply direction of the bidirectional switched mode power supply and a switch having an control pole coupled to the input. The switch is adapted to change the main circuit of the bidirectional switched mode power supply based on the selected power supply direction.

12 Claims, 2 Drawing Sheets

BIDIRECTIONAL SWITCHED MODE POWER SUPPLY

FIELD OF THE INVENTION

The invention relates to the art of switched mode power supplies for elevator power systems.

BACKGROUND OF THE INVENTION

Switched mode power supply (SMPS) devices have traditionally been used to supply power in low-power applications, such as computer systems, consumer electronics, et cetera. The advantages of SMPSs are, among others, small size and good efficiency. Therefore, adopting a SMPS for supplying power in an elevator power system is considered.

Traditionally SMPSs have been operable to supply power in one direction only. In elevator power systems, however, bidirectional supply of power is required. When operating in driving mode, elevator hoisting machine retrieves electrical power from elevator power supply (e.g. mains electricity or backup power supply) to drive elevator car along the elevator hoistway. When operating in generator mode, on the other hand, elevator hoisting machine brakes movement of the elevator car and supplies electrical power back to the elevator power supply.

One solution for bidirectional supply of power is to use two separate antiparallel-connected SMPSs to supply power in opposite directions. This means however that more SMPS units are needed, which somewhat voids the small-size advantage and also increases costs and system complexity.

Some bi-directional SMPSs are also known. These however use substantially low switching frequencies where higher impedance of filtering circuitry can be tolerated. Lower switching frequency has the drawback that the size of the device tends to increase.

SUMMARY OF THE INVENTION

Considering the foregoing, it is the object of the invention to introduce an efficient and compact bidirectional switched mode power supply (bdSMPS) for elevator power systems. This object is achieved with a bidirectional switched mode power supply claimed herein.

A further object of the invention is to introduce an efficient and compact backup power supply device for elevator power systems. This object is achieved with a backup power supply device and an elevator power system according as claimed.

An aspect of the invention is a bidirectional switched mode power supply comprising an input for selecting power supply direction of the bidirectional switched mode power supply and a switch having an control pole coupled to the input. The switch is adapted to change the main circuit of the bidirectional switched mode power supply based on the selected power supply direction. This can mean that partial changes are made to the main circuit topology by adding components or separating components from the main circuit based on the power supply direction. In a preferred embodiment main circuit impedances can be changed to filter direction-dependent disturbances resulting from high-frequency switching. For example it is possible to lower the impedances only in selected points of the main circuit depending on the operating conditions, which means that use of large and complex filtering circuitry can be avoided. On the other hand, low-impedance circuitry can also be separated from the main circuit power switches when needed. Separating the low-impedance circuitry from the power switches means that in some operating situations inrush currents of the power switches can be reduced (inrush currents cause, among others, additional stress and therefore shorten life-time of the power switches; inrush currents may also cause electromagnetic disturbance).

In the disclosure the term "bidirectional switched mode power supply" refers to a switched mode power supply, which is configured to supply power through it in two opposite directions. Consequently, the term "main circuit of the bidirectional switched mode power supply" means the components and connections constituting the functional elements, such as filters, inverter stages, transformers, etc., inside the single bidirectional switched mode power supply via which the power flows in two opposite directions. According to one or more embodiments, the bidirectional switched mode power supply has two connection interfaces and is configured to supply power between them in two opposite directions.

In a preferred embodiment the switch is configured to maintain the main circuit unchanged as long as the selected power supply direction remains the same.

In a preferred embodiment the bidirectional switched mode power supply is a DC/DC converter comprising a transformer having a first coil and a second coil, a first inverter stage coupled to the first coil and a second inverter stage coupled to the second coil. The first and the second inverter stages are configured to transfer power through the transformer in both directions. A first capacitor is connected via a first selection switch in parallel with the first inverter stage. The first selection switch is configured to be conducting when the selected power supply direction is from the first coil to the second coil, and not to be conducting when the selected power supply direction is from the second coil to the first coil.

In a preferred embodiment the DC/DC converter comprises a second capacitor connected via a second selection switch in parallel with the second inverter stage. The second selection switch is configured to be conducting when the selected power supply direction is from the second coil to the first coil and not to be conducting when the selected power supply direction is from the first coil to the second coil.

In a preferred embodiment the DC/DC converter comprises a first DC terminal and an inductor connected between the first capacitor and the first DC terminal In a preferred embodiment the DC/DC converter comprises a second DC terminal and an inductor connected between the second capacitor and the second DC terminal In a preferred embodiment the first DC terminal is a low-voltage terminal and the second DC terminal is a high-voltage terminal.

Another aspect of the invention is a backup power supply device comprising an electrical energy storage unit and a bidirectional switched mode power supply according to the disclosure. The bidirectional switched mode power supply is connected to the electrical energy storage unit. The bidirectional switched mode power supply further has terminal for connecting to a load circuit, and the bidirectional switched mode power supply is configured to supply power from the electrical energy storage unit to the load circuit when the input has a first status, and to supply power from the load circuit to the electrical energy storage unit when the input has a second status.

In a preferred embodiment the low-voltage DC terminal of the bidirectional switched mode power supply is coupled to the electrical energy storage unit and the high-voltage DC terminal of the bidirectional switched mode power supply is configured to be coupled to the load circuit.

Still another aspect of the invention is an elevator installation having a power circuit for supplying electrical power in the elevator installation. The elevator power system comprises the backup power supply device according to the disclosure so implemented, that the load circuit is the power circuit of the elevator power system, and the bidirectional switched mode power supply is connected to the power circuit of the elevator power system.

In a preferred embodiment the elevator power system includes a hoisting machine for driving an elevator car and a frequency converter for controlling the hoisting machine. The high-voltage terminal of the bidirectional switched mode power supply is coupled to the DC intermediate circuit of the frequency converter.

In a preferred embodiment the power supply direction of the bidirectional switched mode power supply is selected based on the driving state of the hoisting machine.

Still another aspect of the invention is a method of supplying power with a bidirectional switched mode power supply. The method comprises selecting power supply direction of the bidirectional switched mode power supply, and changing the main circuit of the bidirectional switched mode power supply based on the selected power supply direction.

In a preferred embodiment the method comprises maintaining the main circuit unchanged as long as the selected power supply direction remains the same.

The embodiments described hereinbefore may be used in any combination with each other, if not indicated otherwise. Several of at least two of the embodiments may be combined together to form a further embodiment. Any aspects of the invention may comprise at least one of the embodiments described hereinbefore.

The preceding summary, as well as the additional features and additional advantages of the invention presented below, will be better understood by the aid of the following description of some embodiments, said description not limiting the scope of application of the invention.

MORE DETAILED DESCRIPTION OF PREFERRED EMBODIMENTS OF THE INVENTION

Figure 1:
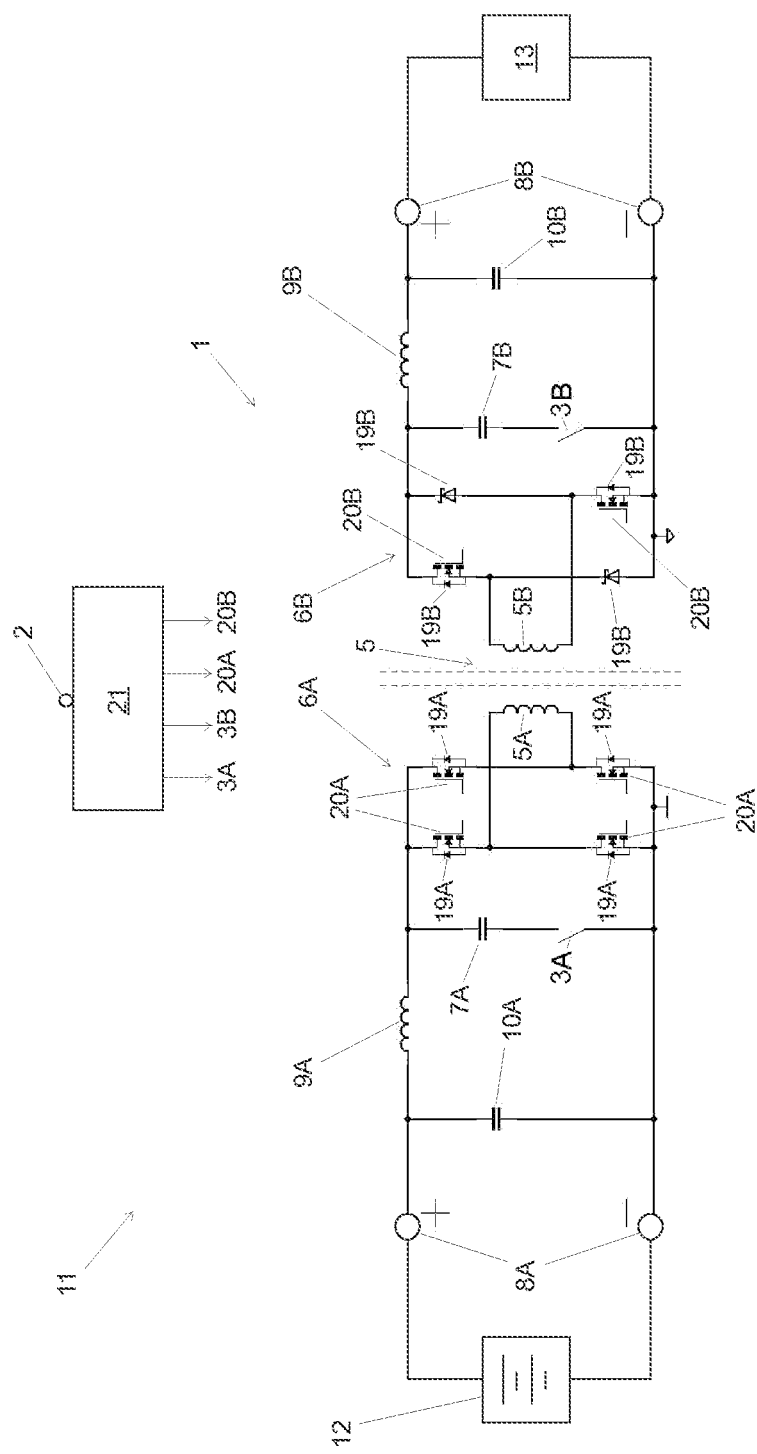
FIG. 1 present a circuit diagram of a backup power supply device according to an embodiment of the invention.
Figure 2:
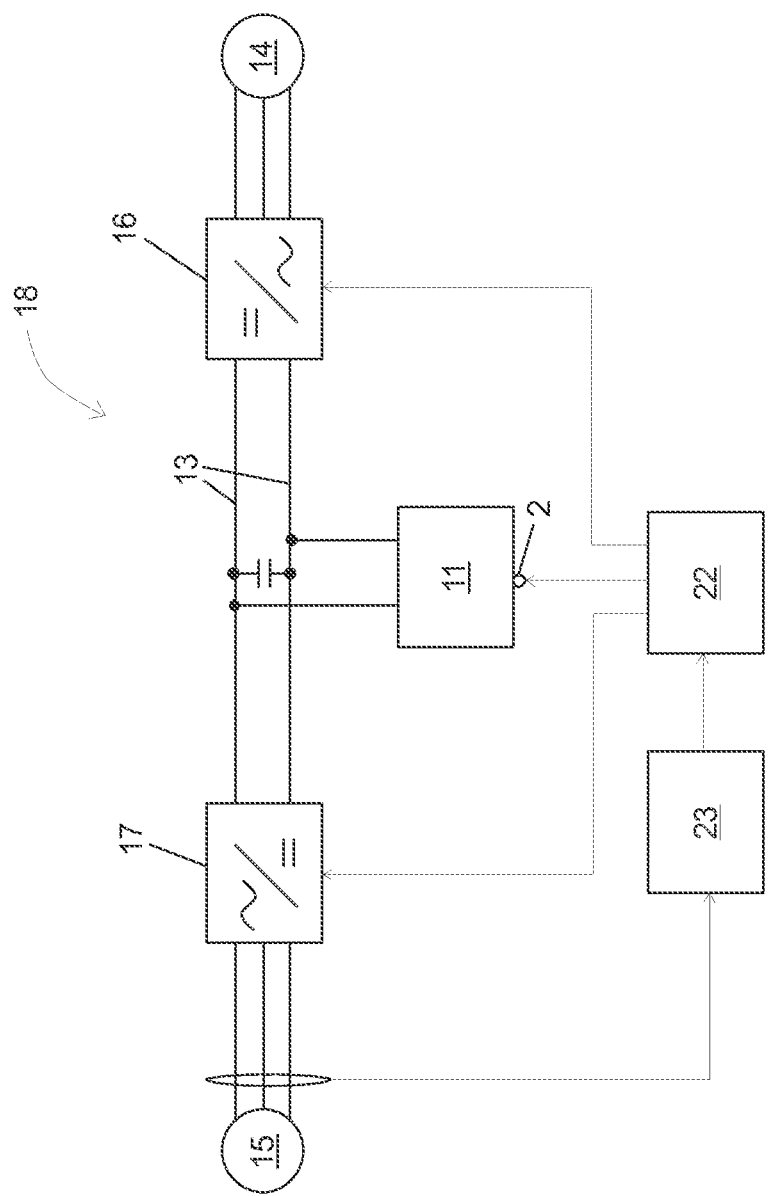
FIG. 2 presents a block diagram of an elevator power system having a backup power supply device of FIG. 1.

For the sake of intelligibility, in FIGS. 1 and 2 only those features are represented which are deemed necessary for understanding the invention. Therefore, for instance, certain components/functions which are widely known to be present in corresponding art may not be represented.

In the description same references are always used for same items.

FIG. 1 represents a backup power supply device, which can be connected to an elevator power system. The backup power supply device comprises an electrical energy storage unit 12, and a bidirectional switched mode power supply (hereinafter referred to as bdSMPS) 1. The energy storage unit 12 may be a set of accumulators, a set of supercapacitors or a combination of both, for example. In this embodiment a set of lead acid batteries is used. The set of batteries is connected to the DC terminal 8A of the bdSMPS 1. At least some of the batteries are connected in series to reach a voltage of approximately 50 volts. The 50 volt terminal 8A is referred to as a low-voltage terminal. The other DC terminal 8B of the bdSMPS may be connected to a high-voltage DC circuit 13, such as the DC intermediate circuit of a frequency converter. The voltage of the DC circuit 13 may be approximately 550 volts-650 volts, and the DC terminal 8B is referred to as a high-voltage terminal The bdSMPS 1 is a DC/DC converter having a forward topology, and it is configured to supply electrical power between the energy storage unit 12 and the DC circuit 13 in two (opposite) directions. The bdSMPS comprises an input 2, via which a serial communication signal is received for selecting power supply direction (e.g. whether power is supplied from the energy storage unit 12 to the DC circuit 13 or vice versa).

The bdSMPS 1 comprises a transformer 5 having a low-voltage coil 5A and a high-voltage coil 5B. The transformer 5 provides galvanic isolation between the electrical energy storage unit 12 and the DC circuit 13. A first inverter stage 6A in the form of solid state switches 20A is connected to the low-voltage coil 5A. Power is transferred from the low-voltage terminal 8A to the high-voltage terminal 8B by operating the solid-state switches 20A of the first inverter stage 6A. In this embodiment the solid-stage switches 20A of the first inverter stage are mosfet transistors, however other suitable components, such as silicon-carbide mosfet transistors, igbt transistors, bipolar transistors etc. may also be used.

A second inverter stage 6B in the form of solid state switches 20B is connected to the high-voltage coil 5B of the transformer 5. Power is transferred from the high-voltage terminal 8B to the low-voltage terminal 8A by operating the solid stage switches 20B of the second inverter stage 6B. In this embodiment the solid-stage switches 20B of the second inverter stage 6B are mosfet transistors, however other suitable (high-voltage) components, such as silicon-carbide mosfet transistors, igbt transistors, bipolar transistors etc. may also be used.

Mosfet transistors 20A and 20B are operated by generating gate control pulses in control 21. In one embodiment, the switching frequency of the mosfet transistors 20A is 49 kHz and the switching frequency of the mosfet transistors 20B is 25 kHz; in other embodiments however other switching frequencies may be used.

Because the bdSMPS 1 transfers bidirectional power, the first 6A and the second 6B inverter stages are configured to transfer power through the transformer 5 in both directions. The first inverter stage 6A is provided with rectifier diodes 19A connected in parallel with the mosfet transistors 20A and the second inverter stage 6B is provided with rectifier diodes 19B connected in parallel with the mosfet transistors 20B. The purpose of the rectifiers 19A, 19B is to rectify transformer 5 output power.

Both DC terminals 8A and 8B are coupled to a low pass LC filter for filtering output power. Low-voltage terminal 8A side output filter includes inductor 9A and capacitor 10A, and high-voltage terminal 8B side output filter includes inductor 9B and capacitor 10B. The purpose of the inductors 9A, 9B is to reduce current gradient of the transformer. Use of the LC filters improves bdSMPS efficiency.

Because operation of the mosfet transistors 20A would cause voltage ripple across the first inverter stage 6A through the inductor 9A, an additional capacitor 7A is to be connected in parallel with the first inverter stage 6A (such that inductor 9A is located between capacitors 7A and 10A). Correspondingly, capacitor 7B is to be connected in parallel with the second inverter stage 6B to even out the voltage ripple caused by inductor 9B when mosfet transistors 20B are operated.

Capacitor 7A is connected via a selection switch 3A in parallel with the first inverter stage 6A and capacitor 7B is connected via a selection switch 3B in parallel with the second inverter stage 6B. Selection switches 3A and 3B may be solid stage switches or mechanical switches, such as relays.

Purpose of the switches 3A and 3B is to separate output side capacitor 7A, 7B from the bdSMPS main circuit. This is because otherwise the output of the rectifier diodes 19A, 19B rectifying output power of the transformer 5 would be directly connected to the capacitor 7A, 7B, thereby causing inrush currents.

The bdSMPS serial communication input 2 is coupled to the control poles of switches 3A and 3B through control 21. Control 21 receives serial communication messages carrying information about the selected power supply direction of the bdSMPS 1 from input 2, and switches 3A and 3B are operated based on the selected power supply direction. It is possible to couple the input 2 to the control poles of the switches 3A, 3B in other ways also. In some embodiments, a control signal path goes directly from input 2 to the control poles of the switches 3A, 3B such that their switching states directly follow the logical state of the selection signal in input 2. This way it may be possible to speed up the changing of the power supply direction.

Selection switch 3A is configured to be conducting when the selected power supply direction is from the low-voltage terminal 8A to the high-voltage terminal 8B (e.g. from the low-voltage coil 5A to the high-voltage coil 5B of the transformer), and not to be conducting when the selected power supply direction opposite. Correspondingly, selection switch 3B is configured to be conducting when the selected power supply direction is from the high-voltage terminal 8B to the low-voltage terminal 8A (e.g. from the high-voltage coil 5B to the low-voltage coil 5A of the transformer) and not to be conducting when the selected power supply direction is opposite. This has the effect that capacitor 7A, 7B located at output side of power supply is always separated from bdSMPS main circuit, thus the inrush current through rectifier diodes 19A, 19B is reduced. Further, the capacitor 7A, 7B located at input side of power supply is always connected to the bdSMPS main circuit, therefore reducing voltage ripple caused by operating inverter stage 6A, 6B. Switching state of the switches 3A, 3B does not change as long as the selected power supply direction remains the same.

FIG. 2 illustrates an elevator power system comprising a backup power supply device 11 of FIG. 1. Elevator power system includes a hoisting machine 14 which is adapted to drive an elevator car in elevator shaft between stopping floors in a manner which as such is known in the art. Elevator power system also includes a frequency converter 18, which is connected to the mains electricity 15. The frequency converter 18 includes an AC/DC rectifier 17 and an inverter 16, which are connected together via a DC intermediate circuit 13. Frequency converter 18 controls the hoisting machine 14 by supplying electrical power from mains 15 to the hoisting machine and vice versa, depending on the operational condition. When operating in driving mode, frequency converter 18 supplies electrical power from mains 15 to the hoisting machine 14 and when operating in generator mode, hoisting machine 14 braking movement of the elevator car generates electricity and frequency converter 18 supplies the electricity generated back to the mains 15. For operating the frequency converter 18, drive control 22 generates control pulses for the frequency converter igbt transistors.

The bdSMPS high-voltage terminal 8B of the backup power supply device 11 is connected to the DC intermediate circuit 13 of the frequency converter 18. The drive control 22 controls operation of the backup power supply device 11 by sending a control signal to the input 2 of the bdSMPS 1. Control signal includes start/stop operation commands as well as selection of the power supply direction.

Drive control 22 is connected to a supervision circuit 23 for detecting a power outage in the mains electricity 15. When the mains 15 is operating normally, batteries 12 of the backup power supply device 11 are charged by supplying power to them with the bdSMPS from mains 15 via the DC intermediate circuit 13. When power outage in mains 15 is detected, elevator operation is continued by supplying power with the bdSMPS 1 from the batteries 12 to the DC intermediate circuit 13 and further to the devices necessary for moving elevator car, e.g. to the hoisting machine and/or brakes and/or selected control units.

The bdSMPS 1 supplies power from batteries 12 to the DC intermediate circuit 13 when hoisting machine 14 operates in driving mode. In some embodiments, when operating in generator mode, the bdSMPS 1 supplies regenerated power from DC intermediate circuit 13 back to the batteries 12 to recharge them. This way operation range and/or operation time of the elevator during power outage may be extended.

In some embodiments, the backup power supply device 11 is adapted to supply power to one or more elevator components also during normal elevator operation. This way it may be possible to reduce power consumption from the mains 15.

In the above embodiments the bdSMPS 1 was implemented as a part of an elevator backup power supply device. A skilled person however understands, that the bdSMPS disclosed may also have other implementations, for example, in elevator power systems, escalator power systems or moving walkway power systems. These implementations include, but are not limited to, DC motor controllers, car door motor controllers, providing galvanic isolation in the frequency converter DC intermediate circuit etc.

While the present inventions have been described in connection with a number of exemplary embodiments, and implementations, the present inventions are not so limited, but rather cover various modifications, and equivalent arrangements, which fall within the purview of prospective claims.

The invention claimed is:

1. A bidirectional switched mode power supply formed from a DC/DC converter comprising:
   a transformer having a first coil and a second coil;
   a first inverter stage connected to the first coil;
   a second inverter stage connected to the second coil,
   the first and the second inverter stages being configured to transfer power through the transformer in both directions;
   a first capacitor connected via a first selection switch in parallel with the first inverter stage;
   wherein the first selection switch is configured to be conducting when the selected power supply direction is from the first coil to the second coil, and not to be conducting when the selected power supply direction is from the second coil to the first coil; and
   a second capacitor connected via a second selection switch in parallel with the second inverter stage;

wherein the second selection switch is configured to be conducting when the selected power supply direction is from the second coil to the first coil and not to be conducting when the selected power supply direction is from the first coil to the second coil.

2. The bidirectional switched mode power supply of claim 1 further comprising:
an input for selecting power supply direction of the bidirectional switched mode power supply;
a switch having an control pole coupled to the input;
wherein the switch is adapted to change the main circuit of the bidirectional switched mode power supply based on the selected power supply direction.

3. The bidirectional switched mode power supply according to claim 2, wherein the switch is adapted to change main circuit impedance by changing the main circuit based on the selected power supply direction.

4. The bidirectional switched mode power supply according to claim 1 or 2, wherein the switch is configured to maintain the main circuit unchanged as long as the selected power supply direction remains the same.

5. The DC/DC converter according to claim 1, wherein the DC/DC converter comprises a first DC terminal and an inductor connected between the first capacitor and the first DC terminal.

6. The DC/DC converter according to claim 1, wherein the DC/DC converter comprises a second DC terminal and an inductor connected between the second capacitor and the second DC terminal.

7. The DC/DC converter according to claim 6, wherein the first DC terminal is a low-voltage terminal and the second DC terminal is a high-voltage terminal.

8. A backup power supply device comprising:
an electrical energy storage unit;
wherein the backup power supply device comprises a bidirectional switched mode power supply according to claim 1,
the bidirectional switched mode power supply being connected to the electrical energy storage unit,
and the bidirectional switched mode power supply having terminal for connecting to a load circuit,
and the bidirectional switched mode power supply being configured to supply power from the electrical energy storage unit to the load circuit when the input has a first status, and to supply power from the load circuit to the electrical energy storage unit when the input has a second status.

9. The backup power supply device according to claim 8, wherein the low-voltage DC terminal of the bidirectional switched mode power supply is coupled to the electrical energy storage unit and the high-voltage DC terminal of the bidirectional switched mode power supply is configured to be coupled to the load circuit.

10. An elevator power system comprising a power circuit for supplying electrical power in the elevator installation, wherein the elevator power system comprises the backup power supply device according to claim 8 or 9, the load circuit is the power circuit of the elevator power system, and the bidirectional switched mode power supply is connected to the power circuit of the elevator power system.

11. The elevator power system according to claim 10, wherein the elevator power system includes a hoisting machine for driving an elevator car and a frequency converter for controlling the hoisting machine,
and wherein the high-voltage terminal of the bidirectional switched mode power supply is coupled to the DC intermediate circuit of the frequency converter.

12. The elevator power system according to claim 10, wherein the power supply direction of the bidirectional switched mode power supply is selected based on the driving state of the hoisting machine.

* * * * *